S. J. PEET.
Screw-Rods.

No. 138,278.  Patented April 29, 1873.

Witnesses.
Geo Gray
H. C. Hale.

Samuel J. Peet.
by his attorney
F. P. Hale

UNITED STATES PATENT OFFICE.

SAMUEL J. PEET, OF BOSTON, MASSACHUSETTS, ASSIGNOR TO THE PEET VALVE COMPANY, OF SAME PLACE.

IMPROVEMENT IN SCREW-RODS.

Specification forming part of Letters Patent No. 138,278, dated April 29, 1873; application filed January 22, 1873.

*To whom it may concern:*

Be it known that I, SAMUEL J. PEET, of Boston, in the county of Suffolk and State of Massachusetts, have invented an Improvement in Screw-Rods and Nuts; and do hereby declare the same to be fully described in the following specification and represented in the accompanying drawing, in which—

Figure 1:
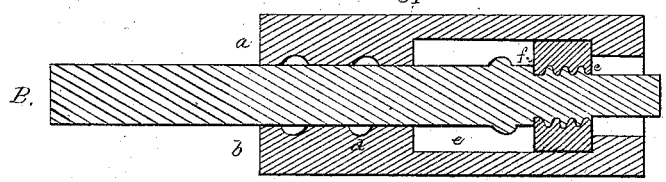
Figure 2:
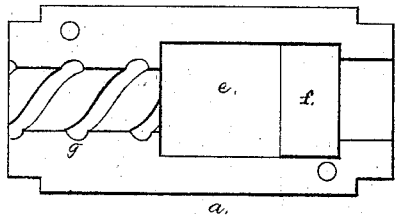
Figure 3:
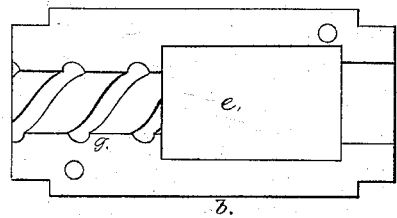
Figure 4:
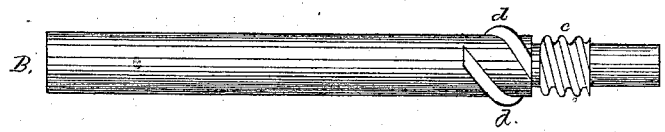

Figure 1 denotes a central and longitudinal section of a device embodying my invention. Fig. 2 is a view of one-half of the metallic case, and Fig. 3 a view of the other half thereof. Fig. 4 is a view of the screw-rod or spindle, showing the combined "slow" and "fast" threads.

The object of my invention is to provide a screw or device for operating valves, &c., in which both power and velocity are secured, my invention securing such result with a saving of both time and labor.

I am aware that it is not new to construct a valve spindle or rod with either a fast or slow screw, each of which, when employed alone, having its disadvantages. The slow screw, while giving the requisite power, requires too great an expenditure of time and labor, while the fast screw, although attaining the desired speed, does so at the expense of power.

My invention seeks to combine the advantages of both without the disadvantages of either when used alone; and my invention consists in forming upon the valve stem or rod two screws or series of threads having different degrees of pitch, such being to operate with nuts having a like degree of pitch, the corresponding screws and nuts being so arranged with respect to each other that as soon as the male screw of one has left its nut the male screw of the other shall have entered its nut, and thereby a continuous movement of the spindle or rod be maintained.

My invention, although specially designed by me for valves for water or steam, is adapted for other purposes when it may be desirable to produce reciprocating motion with variable speed in a right line.

In the said drawing, a denotes a metallic block formed in two parts, $a$ and $b$, the same constituting a compound nut. A cylindrical or other properly shaped hole is made longitudinally through this block to receive a cylindrical rod or spindle, B, having two series of threads, $c\ d$, formed on its surface, such threads having different degrees of pitch, and disposed on the rod, as shown in the drawing. $e$ is a chamber formed within the block to receive a cylindrical nut, $f$, which is firmly secured at one end of the chamber, such nut being to operate with the lesser nut or series of threads $c$. Within the upper part of the block is formed a female screw or nut, $g$, to receive a male screw or series of threads, $d$, made of much greater (about double) pitch that those of the nut $f$, the nuts $f$ and $g$ being so arranged with reference to each other and the corresponding threads of the bolt or rod, that as soon as the male screw of one leaves its nut the male screw of the other shall have entered its nut, and thereby preserve a continuous advance or retraction of the rod, as circumstances may demand, whenever the rod is rotated, and thus avoid any lost motion. The two parts $a$ and $b$ of the block are to be firmly secured by screws or other suitable means.

In using my invention the lower end of the bolt or rod is to be attached to the valve or mechanism to be moved, the upper end thereof being provided with a hand-wheel or other suitable means of imparting rotation thereto.

What I claim as my invention is—

The combination of the rod B, provided with two male screws or series of threads, $c\ d$, of unequal pitch, as described, with the part A having corresponding female screws or nuts $f\ g$, the whole being arranged so as to operate together in manner and for the purpose set forth.

SAMUEL J. PEET.

Witnesses:
F. P. HALE,
F. C. HALE.